United States Patent
Uchino et al.

(10) Patent No.: US 11,246,058 B2
(45) Date of Patent: Feb. 8, 2022

(54) RADIO COMMUNICATION DEVICE AND RADIO COMMUNICATION METHOD

(71) Applicant: NTT DOCOMO, INC., Tokyo (JP)

(72) Inventors: Tooru Uchino, Tokyo (JP); Wuri Andarmawanti Hapsari, Tokyo (JP); Hideaki Takahashi, Tokyo (JP); Akihito Hanaki, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/493,406

(22) PCT Filed: Mar. 14, 2017

(86) PCT No.: PCT/JP2017/010280
§ 371 (c)(1),
(2) Date: Sep. 12, 2019

(87) PCT Pub. No.: WO2018/167858
PCT Pub. Date: Sep. 20, 2018

(65) Prior Publication Data
US 2020/0022023 A1 Jan. 16, 2020

(51) Int. Cl.
*H04L 12/66* (2006.01)
*H04W 28/06* (2009.01)
*H04W 80/02* (2009.01)

(52) U.S. Cl.
CPC ............ *H04W 28/06* (2013.01); *H04W 80/02* (2013.01)

(58) Field of Classification Search
None
See application file for complete search history.

(56) References Cited

U.S. PATENT DOCUMENTS 8,559,463 B2 * 10/2013 Blanchard ............... H04L 69/04
 370/477
8,837,495 B2 * 9/2014 Takahashi ............ H04W 76/15
 370/395.54
(Continued)

FOREIGN PATENT DOCUMENTS

JP 2000-196668 A 7/2000
JP 2009-267843 A 11/2009
(Continued)

OTHER PUBLICATIONS

Extended European Search Report issued in European Application No. 17900550.9, dated Aug. 20, 2020 (10 pages).
International Search Report issued in PCT/JP2017/010280 dated Jun. 6, 2017 (5 pages).
Written Opinion of the International Searching Authority issued in PCT/JP2017/010280 dated Jun. 6, 2017 (6 pages).
Apple, LG Electronics; "Enable eNB to configure ROHC for uplink or Downlink channels in same PDCP entity"; 3GPP TSG-RAN WG2, R2-1701763; Athens, Greece; Feb. 13-17, 2017 (5 pages).
Apple, LG Electronics; "RoHC Symmetric DL/UL Parameters Limitation in LTE"; 3GPP TSG-RAN WG2 #97, R2-1701761; Athens, Greece; Feb. 13-17, 2017 (3 pages).
(Continued)

*Primary Examiner* — Sithu Ko
(74) *Attorney, Agent, or Firm* — Osha Bergman Watanabe & Burton LLP

(57) ABSTRACT

UE (200) performs Asymmetric ROHC that applies header compression in a packet data convergence protocol layer to either an uplink or a downlink. The UE (200) includes a data transmitting-receiving unit (220) that receives from eNB a support notification indicating that the Asymmetric ROHC is supported and a capability notifying unit (240) that notifies, when the data transmitting-receiving unit (220) receives the support notification, the eNB of information to be used for setting the Asymmetric ROHC by including a profile of the Asymmetric ROHC in capability information of the UE (200).

4 Claims, 15 Drawing Sheets

(56) References Cited

U.S. PATENT DOCUMENTS

| | | | |
|---|---|---|---|
| 2004/0125793 A1* | 7/2004 | Yi | H04L 67/04 370/352 |
| 2007/0195764 A1* | 8/2007 | Liu | H04W 28/24 370/389 |
| 2012/0155375 A1* | 6/2012 | Zhu | H04L 69/22 370/315 |
| 2013/0039342 A1 | 2/2013 | Kazmi | |
| 2016/0007230 A1* | 1/2016 | Uchino | H04W 72/042 370/329 |
| 2016/0142518 A1* | 5/2016 | Raina | H04L 69/04 370/230 |
| 2016/0183123 A1* | 6/2016 | Chebolu | H04W 28/06 370/329 |
| 2017/0181206 A1* | 6/2017 | Lee | H04W 28/06 |
| 2017/0257796 A1* | 9/2017 | Hsu | H04L 69/04 |
| 2018/0124639 A1* | 5/2018 | Bathwal | H04L 69/04 |
| 2018/0242192 A1* | 8/2018 | Zhao | H04L 69/04 |
| 2019/0273543 A1* | 9/2019 | Yang | H04W 72/12 |

FOREIGN PATENT DOCUMENTS

| | | |
|---|---|---|
| JP | 2014-525698 A | 9/2014 |
| JP | 2015-012403 A | 1/2015 |
| JP | 2016-046652 A | 4/2016 |
| WO | 2004017578 A1 | 2/2004 |

OTHER PUBLICATIONS

Office Action issued in the counterpart Japanese Patent Application No. 2019-505574, dated Apr. 22, 2021 (5 pages).

* cited by examiner

FIG. 14

| ALLOCATION PATTERN | Symmetric | Asymmetric |
|---|---|---|
| 1 | 0 | 5 |
| 2 | 2 | 3 |
| 3 | 4 | 1 |
| ... | ... | .. |

Sym ROHC capability
maxNumberROHC-ContextSessions: 1

Asym ROHC capability
maxNumberROHC-ContextSessions: 2

(b)

Max capability
maxNumberROHC-ContextSessions: 15

Asym ROHC capability
maxNumberROHC-ContextSessions: 1 maxNumberROHC-ContextSessions: 3 maxNumberROHC-ContextSessions: 5

(c)

ROHC capability
ContextSessionPatternIndex : 1

ContextSessionPatternIndex : 3

ContextSessionPatternIndex  4

RADIO COMMUNICATION DEVICE AND RADIO COMMUNICATION METHOD

TECHNICAL FIELD

The present invention relates to a radio communication device and a radio communication method capable of applying header compression in a packet data convergence protocol layer (PDCP layer).

BACKGROUND ART

3rd Generation Partnership Project (3GPP) specifies Long Term Evolution (LTE), and with the aim of further speeding of the LTE, specifies LTE-Advanced (hereinbelow, the LTE includes the LTE-Advanced). Moreover, in the 3GPP, further, specification of succeeding systems of the LTE called 5G (5th generation mobile communication system) and the like is being considered.

In the LTE, voice packets can be transmitted (VoLTE); however, because a voice packet has a high ratio of the header (RTP/UDP/IP) to the payload, it is prescribed to compress the header of the voice packet. Specifically, in a packet data convergence protocol layer (PDCP layer) of the LTE, the header, such as the RTP/UDP/IP, is compressed based on RObust Header Compression (ROHC) prescribed in RFC3095 and the like. By doing so, the transmission efficiency of the voice packet is increased.

In the LTE, a plurality of ROHC Profiles is prescribed depending on the type and the like of the headers that are to be compressed. A user device (User Equipment, UE) notifies a radio base station (eNB) of supported ROHC Profile (supportedROHC-Profiles), and the number of the sessions usable for the ROHC, specifically, capability information (UE-EUTRA-Capability) of the UE including the fields of the number of the memories usable for the ROHC (maxNumberROHC-ContextSessions).

On the other hand, in Release-14 of the LTE, mainly with the aim of reducing the memory and the power consumption of the UE, it is being considered to apply the header compression by application of the ROHC (for the sake of convenience this will be referred to as Asymmetric ROHC (asymmetric header compression)) to only an uplink (UL) or to only a downlink (DL) (e.g., see Non-Patent Document 1).

PRIOR ART DOCUMENT

Non-Patent Document

Non-Patent Document 1: "RoHC Symmetric DL/UL Parameters Limitation in LTE", 3GPP TSG-RAN WG2 #97, R2-1701761, February 2017

SUMMARY OF THE INVENTION

Because the Asymmetric ROHC (asymmetric header compression) is a control that puts a limitation to the existing header compression (for the sake of convenience this will be referred to as Symmetric ROHC (symmetric header compression)) in which the ROHC is applied to both the UL and the DL, a backward compatibility cannot be secured by merely introducing the Asymmetric ROHC.

Specifically, even if the contents indicating the support to the Asymmetric ROHC is merely added to the existing field (supportedROHC-Profiles) that indicates the UE capability (UE-EUTRA-Capability), a non-supporting eNB, which is eNB that does not support the Asymmetric ROHC, cannot recognize the contents of the field relating to the Asymmetric ROHC. Therefore, the non-supporting eNB attempts to perform the setting of the Symmetric ROHC with the UE that supports the Asymmetric ROHC. As a result, there is a concern that the Asymmetric ROHC may not be set correctly.

The present invention has been made in view of the above discussion. One object of the present invention is to provide a radio communication device, such as a user device, and a radio communication method that can suitably set the asymmetric header compression even when a radio base station that supports the asymmetric header compression, in which the header compression by the ROHC is applied in one of the uplink and the downlink, and a radio base station that supports only the existing symmetric header compression coexist.

A radio communication device according to one aspect of the present invention is a radio communication device that performs asymmetric header compression in which header compression is applied in a packet data convergence protocol layer to either an uplink or a downlink. The radio communication device includes a support notification receiving unit that receives from an opposing radio communication device a support notification indicating that the asymmetric header compression is supported; and a capability notifying unit that, when the support notification receiving unit receives the support notification, notifies the opposing radio communication device of information used for setting the asymmetric header compression by including a profile of the asymmetric header compression in capability information of the radio communication device.

A radio communication device according to another aspect of the present invention is a radio communication device that performs asymmetric header compression in which header compression is applied in a packet data convergence protocol layer to either an uplink or a downlink. The radio communication device includes a packet receiving unit that receives a compressed packet to which the header compression has been applied; and a negative response transmitting unit that, when the packet receiving unit receives the compressed packet, transmits to an opposing radio communication device a negative response indicating that the compressed packet could not be received, to apply the asymmetric header compression in which the header compression is not applied in a receiving direction of the radio communication device.

A radio communication device according to still another aspect of the present invention is a radio communication device that performs asymmetric header compression in which header compression is applied in a packet data convergence protocol layer to either an uplink or a downlink. The radio communication device includes a capability notifying unit that notifies an opposing radio communication device of capability information of the radio communication device. The capability notifying unit notifies of the capability information including a field indicating contents of symmetric header compression in which the header compression is applied in both the uplink and the downlink and a field indicating contents of the asymmetric header compression that is different from the filed indicating contents of the symmetric header compression.

A radio communication method according to still another aspect of the present invention is a radio communication method implemented on a radio communication device that performs asymmetric header compression in which header compression is applied in a packet data convergence protocol layer to either an uplink or a downlink. The radio communication method includes receiving from an opposing radio communication device a support notification indicating that the asymmetric header compression is supported; and notifying, upon receiving the support notification, the opposing radio communication device of information used for setting the asymmetric header compression by including a profile of the asymmetric header compression in capability information of the radio communication device.

A radio communication method according to still another aspect of the present invention is a radio communication method implemented on a radio communication device that performs asymmetric header compression in which header compression is applied in a packet data convergence protocol layer to either an uplink or a downlink. The radio communication method includes receiving a compressed packet to which the header compression has been applied; and transmitting, upon receiving the compressed packet at the receiving, to an opposing radio communication device a negative response indicating that the compressed packet could not be received, to apply the asymmetric header compression in a receiving direction of the radio communication device.

A radio communication method according to still another aspect of the present invention is a radio communication method implemented on a radio communication device that performs asymmetric header compression in which header compression is applied in a packet data convergence protocol layer to either an uplink or a downlink. The radio communication method includes including in capability information of the radio communication device a field indicating contents of symmetric header compression in which the header compression is applied in both the uplink and the downlink and a field indicating contents of the asymmetric header compression that is different from the filed indicating contents of the symmetric header compression; and notifying an opposing radio communication device of the capability information.

BRIEF DESCRIPTION OF DRAWINGS

FIG. 14 is a view showing an example of allocation patterns specified by the UE 200 when the Symmetric ROHC and the Asymmetric ROHC coexist.

FIGS. 15A to 15C are views showing notification examples of the allocation patterns when the Symmetric ROHC and the Asymmetric ROHC coexist.

MODES FOR CARRYING OUT THE INVENTION

Figure 1:
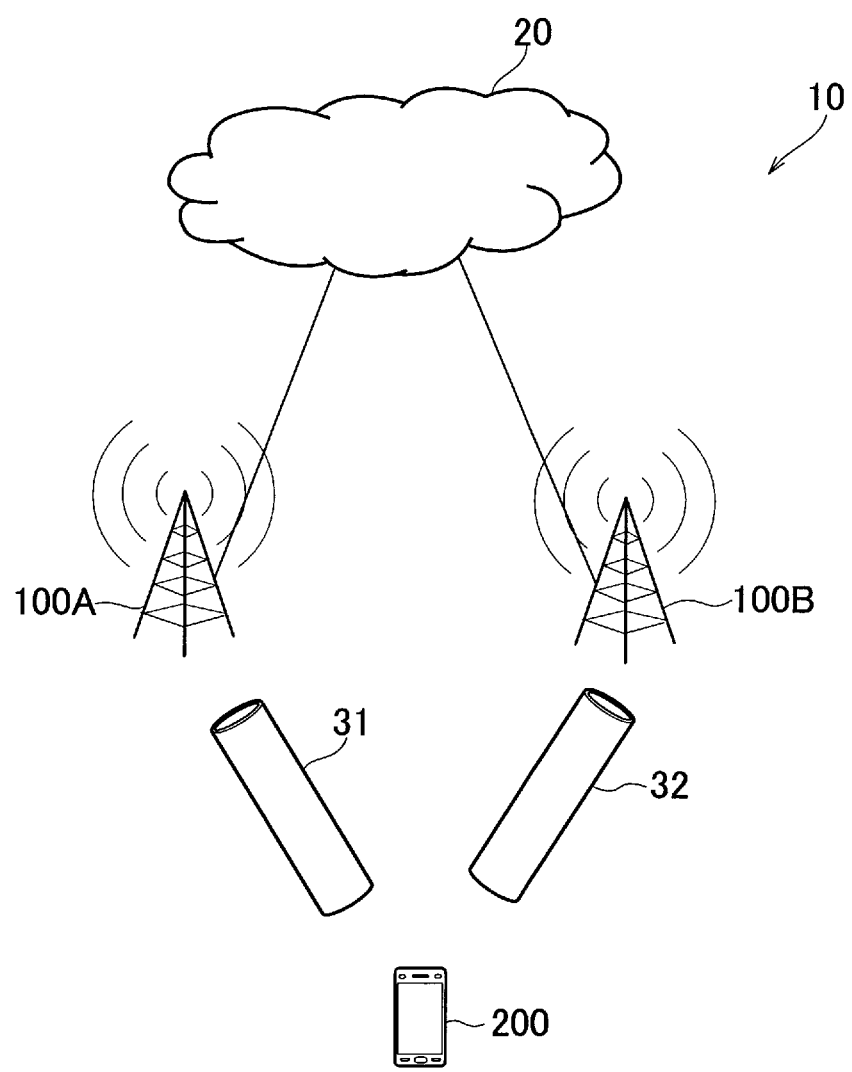
FIG. 1 is an overall structural diagram of a radio communication system 10.

Exemplary embodiments are explained below with reference to the accompanying drawings. In the drawings, structural elements having the same or similar functions or same or similar configuration are indicated by the same or similar reference numerals and the explanation thereof is appropriately omitted.

(1) Overall Structural Configuration of Radio Communication System

FIG. 1 is an overall structural diagram of a radio communication system 10 according to the present embodiment. The radio communication system 10 is a radio communication system in accordance with Long Term Evolution (LTE). The radio communication system 10 includes a radio access network 20 and a user device 200 (hereinafter, "UE 200").

The radio access network 20 is Evolved Universal Terrestrial Radio Access Network (E-UTRAN) prescribed in the 3GPP. The radio access network 20 includes a radio base station 100A (hereinafter, "eNB 100A") and a radio base station 100B (hereinafter, "eNB 100B"). Note that, the radio communication system 10 is not necessarily limited to the LTE (E-UTRAN). For example, the radio access network 20 can be a radio access network including a radio base station that performs radio communication with the UE 200 (user device) stipulated as 5G.

The eNBs 100A and 100B and the UE 200 perform radio communication in accordance with the specification of the LTE. Specifically, the eNB 100A and the UE 200 perform the radio communication in accordance with LTE Release-14. On the other hand, the eNB 100B does not support the LTE Release-14 but supports Release that is prior to the Release-14 (e.g., Release-13). Moreover, the eNBs 100A and 100B and the UE200 support transmission of voice packets (VoLTE).

In the present embodiment, the UE 200 constitutes the radio communication device and the eNB 100A constitutes an opposing radio communication device that opposes and performs the radio communication with the UE 200.

The UE 200 sets a data radio bearer (DRB), which is a radio bearer for user data, with the eNBs 100A and 100B. Specifically, the UE 200 sets DRB 31 with the eNB 100A. Moreover, the UE200 sets DRB 32 with the eNB 100B. Note that, the UE 200 sets a radio bearer (not-shown SRB) for signaling with the eNB 100A and the eNB 100B.

Each of the eNB 100A and the UE 200 performs asymmetric header compression, in which the header compression (specifically, ROHC RTP/UDP/IP and the like) is applied in the packet data convergence protocol layer (PDCP layer) to one of the uplink (UL) and the downlink (DL). Specifically, each of the eNB 100A and the UE 200 supports the Asymmetric ROHC, in which the header compression by application of RObust Header Compression (ROHC) is applied only to the UL or to the DL. Note that, in the present embodiment, a case is explained as an example in which the ROHC is applied only to the UL and the ROHC is not applied to the DL.

(2) Functional Block Configuration of Radio Communication System

A functional block configuration of a radio communication system 10 is explained below. Specifically, a functional block configuration of each of the eNB 100A and the UE 200 is explained below.

(2.1) UE 200

Figure 2:
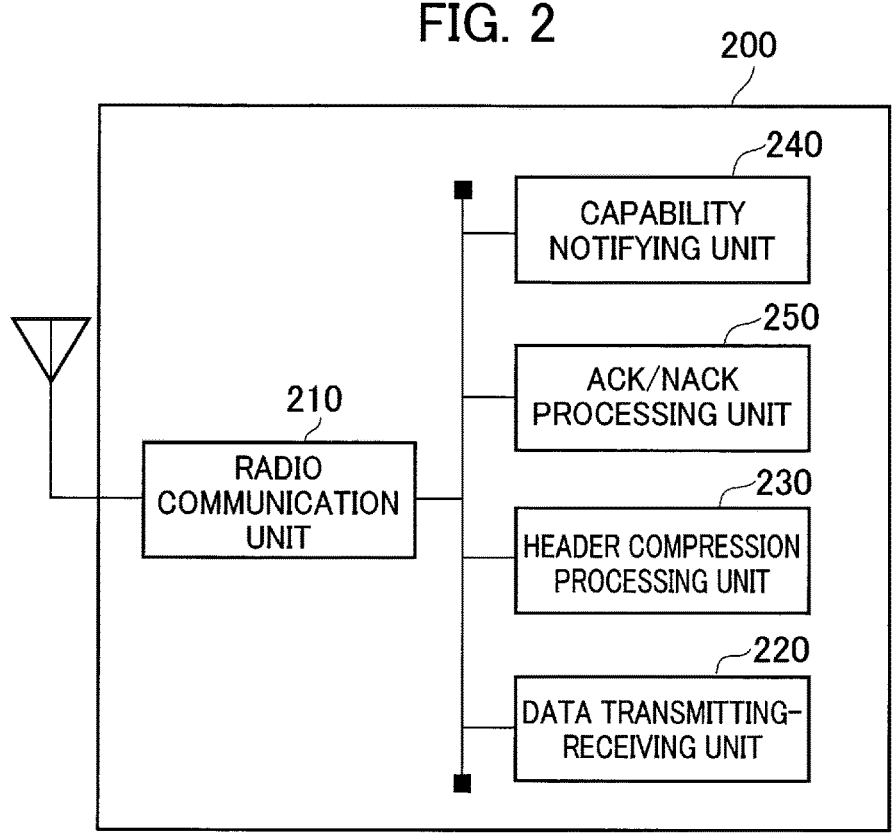
FIG. 2 is a functional block diagram of UE 200.

FIG. 2 is functional block diagram of the UE 200. As shown in FIG. 2, the UE 200 includes a radio communication unit 210, a data transmitting-receiving unit 220, a header compression processing unit 230, a capability notifying unit 240, and ACK/NACK processing unit 250.

The radio communication unit 210 performs the radio communication with the eNB 100A and the eNB 100B in accordance with the LTE. Specifically, the radio communication unit 210 can set the DRB 31 (see FIG. 1) with the eNB 100A. Moreover, the radio communication unit 210 can set the DRB 32 (see FIG. 1) with the eNB 100B. Furthermore, the radio communication unit 210 can set the radio bearer (not-shown SRB) for signaling with the eNB 100A and the eNB 100B.

The data transmitting-receiving unit 220 transmits and receives packets including user data and packet including control data.

Moreover, the data transmitting-receiving unit 220 receives notification information (MIB (Master Information Block) and SIB (System Information Block)) from the radio access network 20 (specifically, from the eNB 100A or the eNB 100B). Furthermore, the data transmitting-receiving unit 220 receives information by dedicated signaling. Particularly, in the present embodiment, the data transmitting-receiving unit 220 receives UE capability enquiry or RRC Connection Reconfiguration. Note that, the notification information and/or the signaling will be explained later. Even in the following explanation, the later explained types and means can be suitably applied to the notification information and/or the signaling.

The data transmitting-receiving unit 220 receives a support notification, which indicates that the eNB 100A supports the Asymmetric ROHC (asymmetric header compression), from the eNB 100A (opposing radio communication device). In the present embodiment, the data transmitting-receiving unit 220 constitutes a support notification receiving unit.

Specifically, the data transmitting-receiving unit 220 receives the support notification in the notification information or by the dedicated signaling.

Moreover, the data transmitting-receiving unit 220 receives compressed packets to which the ROHC has been applied. In the present embodiment, the data transmitting-receiving unit 220 constitutes a packet receiving unit. Specifically, the data transmitting-receiving unit 220 receives, after receiving a non-compressed packet to which the ROHC (header compression) has not been applied, a compressed packet following the non-compressed packet.

The header compression processing unit 230 performs compression and/or decompression of the header of the packets that the data transmitting-receiving unit 220 transmits and/or receives. Specifically, the header compression processing unit 230 performs the compression (compress) and the decompression (decompress) of the RTP/UDP/IP headers and the like according to the ROHC. The header compression processing unit 230 includes a memory depending on the number of the sessions (maxNumber-ROHC-ContextSessions) usable for the header compression.

In the ROHC, for RTP packet such as the voice packet, among RTP/UDP/IP header fields, only a part that is changed is transmitted between packets. By doing so, the number of the bits that are actually transmitted is reduced. In the ROHC, the header can be compressed to as less as 3 bytes.

As the fields that do not change (Static part), SSRC (identifier of RTP layer), an IP address, and the like, can be mentioned. As the field that can change (dynamic part), RTP timestamp, RTP-Sequence Number, UDP checksum, and the like, can be mentioned.

Note that, sometimes a plurality of RTP/RTCP session may be set for one bearer (DRB). In that case, among those sessions, for how many sessions the header compression is possible depends on the capability of the UE 200 and the eNB 100A (eNB 100B).

As mentioned earlier, the UE 200, that is the header compression processing unit 230, supports the Asymmetric ROHC.

Figure 4:
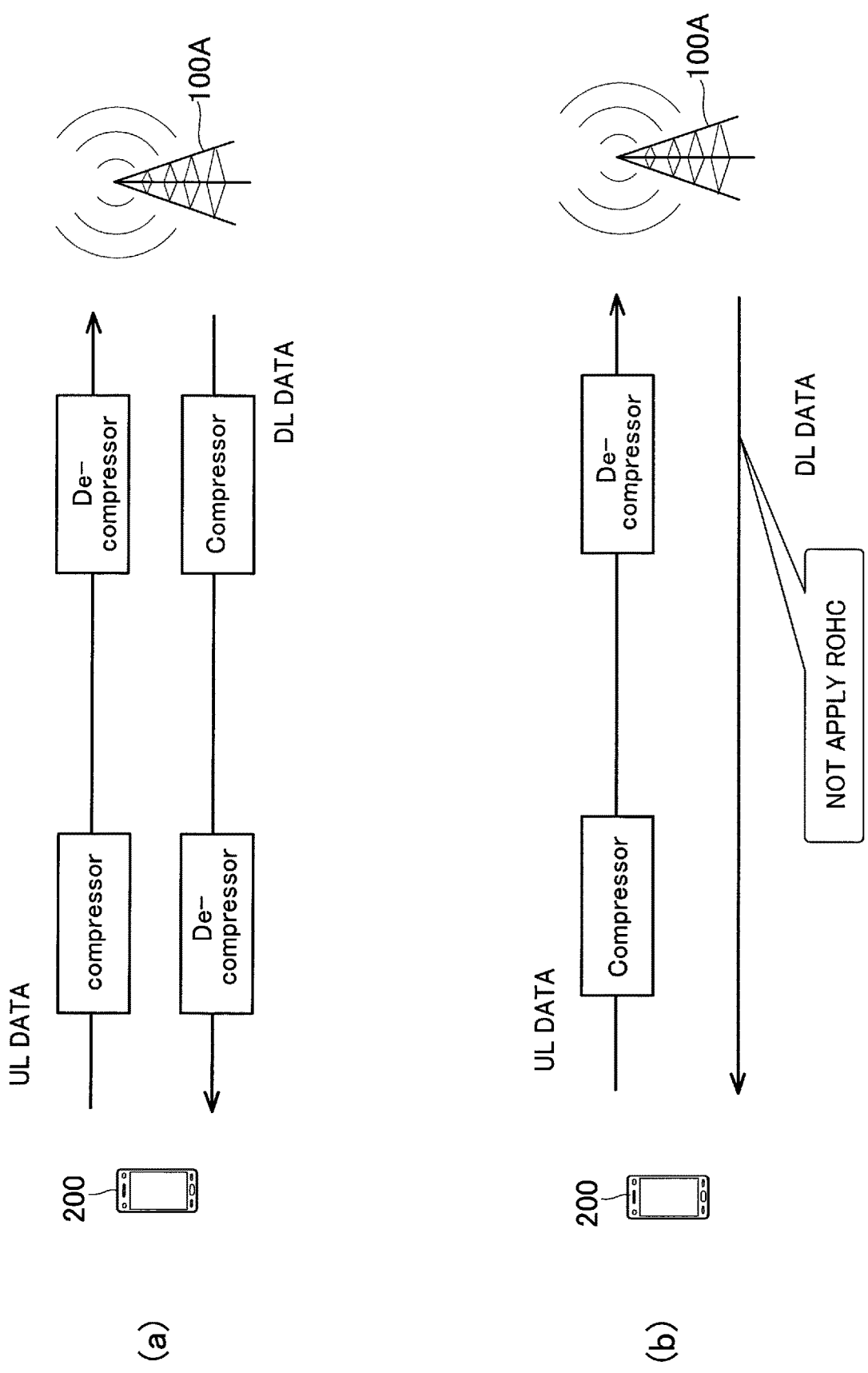
FIGS. 4A and 4B are schematic diagrams of Symmetric ROHC and Asymmetric ROHC.

FIGS. 4A and 4B are schematic diagrams of the Symmetric ROHC and the Asymmetric ROHC. Specifically, FIG. 4A is the schematic diagram of the Symmetric ROHC (symmetric header compression) and FIG. 4B is the schematic diagram of the Asymmetric ROHC (asymmetric header compression).

As shown in FIGS. 4A and 4B, in the Symmetric ROHC, the header compression and decompression are performed by application of the ROHC to both of the UL data and DL data (packet), whereas, in the Asymmetric ROHC, the header compression and decompression is performed only to the UL data by application of the ROHC. That is, the ROHC is not applied to the DL data.

The motivation for introducing the Asymmetric ROHC, when a radio resource of the DL and the UL is asymmetric like TDD (Time Division Duplex), is based on an assumption that the advantage (transmission efficiency) of the ROHC is prominent only in one of the links. For example, in a TDD configuration in which the number of the subframes in the DL is considerably larger than the number of the subframes in the UL, the advantage of the ROHC is prominent in the UL in which the radio resources (the number of the subframe) is less.

Note that, as a method for not applying the ROHC to one of the links, a method of bypassing the ROHC (Compressor) or a method of allocating data only to Uncompressed session can be considered.

The capability notifying unit 240 notifies the eNB 100A (opposing radio communication device) of the capability information of the UE 200 (radio communication device). Note that, the capability notifying unit 240 can also notify the eNB 100B of the capability information. In this example, it is assumed that the capability information is notified only to the eNB 100A.

The capability notifying unit 240 notifies the eNB 100A, as the capability information of the UE 200, of UE-EUTRA-Capability.

Specifically, when the data transmitting-receiving unit 220 (support notification receiving unit) receives the support notification, the capability notifying unit 240 includes a profile of the Asymmetric ROHC in the capability information of the UE 200 whereby the eNB 100A is notified of information (this information will be called ROHC Capability) to be used for setting the Asymmetric ROHC.

Note that, the profiles of the existing Symmetric ROHC are prescribed in Chapter 5.5.1 (Supported header compression protocols and profiles) of 3GPP TS 36.323 Packet Data Convergence Protocol (PDCP) specification. In the present embodiment, profiles (ROHC Profile) of the Asymmetric ROHC are added.

More specifically, when the data transmitting-receiving unit 220 (support notification receiving unit) receives the support notification, the capability notifying unit 240 can notify the eNB 100A of the capability information (UE-EUTRA-Capability) including a field indicating the contents of the Symmetric ROHC that is the ROHC to be applied to both the UL and the DL and a field indicating the contents of the Asymmetric ROHC that is separate from the field indicating the contents of the Symmetric ROHC.

Moreover, when the data transmitting-receiving unit 220 (support notification receiving unit) receives the support notification, the capability notifying unit 240 can notify the eNB 100A of the capability information, by including in the field indicating the contents of the Symmetric ROHC, information indicating that the Asymmetric ROHC is supported.

That is, by including the profile (ROHC Profile) of the Asymmetric ROHC in the UE-EUTRA-Capability, the capability notifying unit 240 can notify the eNB 100A of the information to be uses for setting the Asymmetric ROHC.

Moreover, regardless of whether the data transmitting-receiving unit 220 (support notification receiving unit) receives the support notification, the capability notifying unit 240 can notify the eNB 100A of the capability information including the field indicating the contents of the Symmetric ROHC and the field indicating the contents of the Asymmetric ROHC that is separate from the field indicating the contents of the Symmetric ROHC.

Each of the field indicating the contents of the Symmetric ROHC and the field indicating the contents of the Asymmetric ROHC includes a profile (supportedROHC-Profiles) of the supported header compression and the number of the sessions (maxNumberROHC-ContextSessions) usable for the header compression.

Note that, the capability notifying unit 240 can commonly use the field indicating the profile (supportedROHC-Profiles) of the Symmetric ROHC for at least the profile of the Asymmetric ROHC. Furthermore, the capability notifying unit 240 can commonly use the number of the sessions (maxNumberROHC-ContextSessions) usable for the header compression of the Symmetric ROHC with the field indicating the number of the sessions usable for the header compression of the Asymmetric ROHC.

The ACK/NACK processing unit 250 performs transmission processing of ACK (positive response) and NACK (negative response) with respect to the packets received by the data transmitting-receiving unit 220.

Particularly, in the present embodiment, when the data transmitting-receiving unit 220 (packet receiving unit) receives the compressed packet compressed by the application of the ROHC, the ACK/NACK processing unit 250, to apply the Asymmetric ROHC, that is, to not apply the ROHC, in a receiving direction of the UE 200 (radio communication device), that is, with the aim to apply the Asymmetric ROHC, transmits the NACK (negative response) to the eNB 100A (opposing radio communication device) indicating that the compressed packet could not be received.

Note that, the NACK is transmitted not only when the compressed packet could not be received but also when the header of the compressed packet could not be decompressed. In the present embodiment, the ACK/NACK processing unit 250 constitutes a negative response transmitting unit.

Specifically, when applying the Asymmetric ROHC thereby not applying the ROHC to the DL, upon receiving the compressed packet compressed by the application of the ROHC subsequent to receiving the non-compressed packet, the ACK/NACK processing unit 250 returns the NACK or the STATIC-NACK corresponding to the compressed packet. Accordingly, the header compression by application of the ROHC is canceled, and the data transmitting-receiving unit 220 can receive the non-compressed packets in succession.

(2.2) eNB 100A

Figure 3:
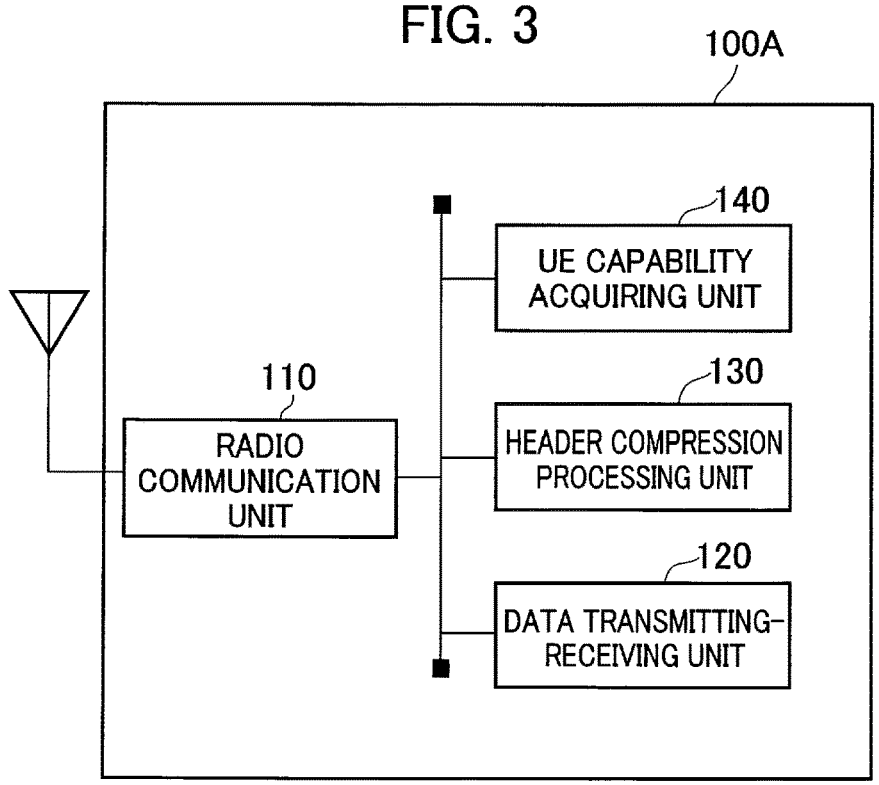
FIG. 3 is a functional block diagram of eNB 100A.

FIG. 3 is a functional block diagram of the eNB 100A. As shown in FIG. 3, the eNB 100A includes a radio communication unit 110, a data transmitting-receiving unit 120, a header compression processing unit 130, and UE capability acquiring unit 140.

The radio communication unit 110 performs the radio communication with the UE 200 in accordance with the LTE like the radio communication unit 210. Specifically, the radio communication unit 110 can set the DRB 31 (see FIG. 1) with the UE 200. Furthermore, the radio communication unit 110 can set the radio bearer (not-shown SRB) for the signaling with the UE 200.

The data transmitting-receiving unit 120 transmits and receives packets including user data and packets including control data like the data transmitting-receiving unit 220.

Moreover, the data transmitting-receiving unit 120 transmits notification information (MIB (Master Information Block) and SIB (System Information Block)). Furthermore, the data transmitting-receiving unit 120 transmits information by the dedicated signaling. Particularly, in the present embodiment, the data transmitting-receiving unit 120 transmits the UE capability enquiry or the RRC Connection Reconfiguration.

The data transmitting-receiving unit 120 transmits the support notification, which indicates that the eNB 100A support the Asymmetric ROHC (asymmetric header compression), to the UE 200. Specifically, the data transmitting-receiving unit 120 transmits the support notification in the notification information or by the dedicated signaling.

The header compression processing unit 130 performs the header compression processing of the packets that the data transmitting-receiving unit 120 transmits and/or receives like the header compression processing unit 230. Specifically, the header compression processing unit 130 performs the header compression processing based on the capability information of the UE 200 acquired by the UE capability acquiring unit 140.

More specifically, the header compression processing unit 130 performs the compression (compress) and the decompression (decompress) of the RTP/UDP/IP headers and the like according to the ROHC.

Moreover, as mentioned earlier, the eNB 100A, that is, the header compression processing unit 130, supports the Asymmetric ROHC.

The UE capability acquiring unit 140 acquires the capability information of the UE 200. Specifically, the UE capability acquiring unit 140 acquires various capacities of the UE 200 based on the contents of the UE-EUTRA-Capability notified of from the UE 200.

Particularly, in the present embodiment, regarding the Symmetric ROHC and the Asymmetric ROHC, the UE capability acquiring unit 140 acquires a profile (supportedROHC-Profiles) of the supported header compression and the number of the sessions (maxNumberROHC-ContextSessions) usable for the header compression.

The UE capability acquiring unit 140 provides the acquired information to the header compression processing unit 130 and the like.

(3) Operation of Radio Communication System

An operation of the radio communication system 10 is explained below. Specifically, an application operation of the Asymmetric ROHC in the eNB 100A and the UE 200 is explained below.

More specifically, the following three operation examples are explained below.

(i) The UE 200 notifies of the capability information of the Asymmetric ROHC only when the radio access network 20 (eNB 100A) supports the Asymmetric ROHC.

(ii) The UE 200 transmits the NACK with respect to the compressed packet compressed by the application of the ROHC and transmitted from the eNB 100A.

(iii) The UE 200 transmits the capability information of both the Symmetric ROHC and the Asymmetric ROHC.

(3.1) Operation Example 1

Figure 5:
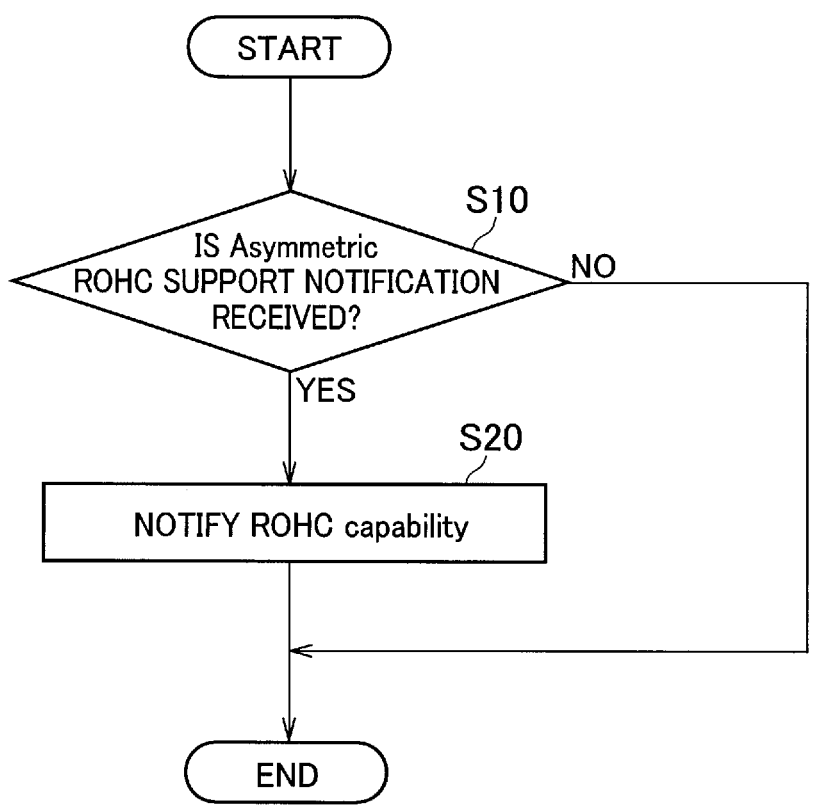
FIG. 5 is an operational flowchart (Operation Example 1) of the UE 200.

FIG. 5 is an operational flowchart (Operation Example 1) of the UE 200. As shown in FIG. 5, the UE 200 determines whether the support notification that indicates that the radio access network 20 (eNB 100A) supports the Asymmetric ROHC is received from the eNB 100A (Step S10). By performing this step, the UE 200 can recognize that the eNB 100A supports the Asymmetric ROHC.

Note that, it is not necessary that information that the eNB 100A supports the Asymmetric ROHC is directly included in the support notification. It is allowable that the support notification containing a version of the RRC (Radio Resource Control) in which the Asymmetric ROHC is introduced can be transmitted.

Upon receiving the support notification, the UE 200 notifies the eNB 100A of information (ROHC Capability) to be used for the setting of the Asymmetric ROHC (Step S20).

Specifically, the UE 200 notifies the eNB 100A of the capability information (UE-EUTRA-Capability) of the UE 200 including the profile (supportedROHC-Profiles) of the supported header compression and the number of the sessions (maxNumberROHC-ContextSessions) usable for the header compression.

Figure 6:
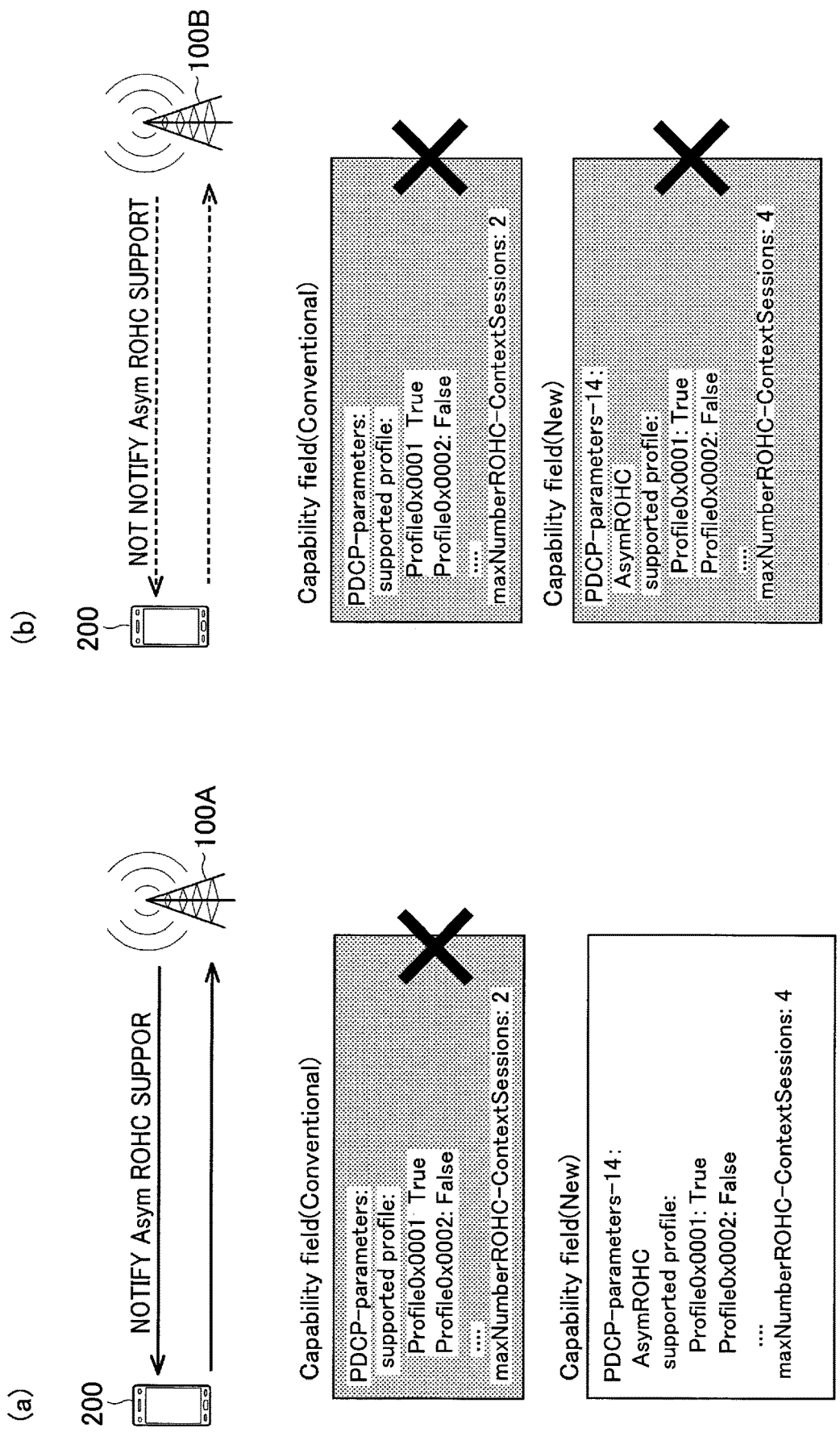
FIGS. 6A and 6B are views showing a configuration example of a field indicating the contents of the existing Symmetric ROHC and a field indicating the contents of the Asymmetric ROHC.

FIGS. 6A and 6B are views showing configuration examples of a field indicating the contents of the existing Symmetric ROHC and a field indicating the contents of the Asymmetric ROHC.

The field (Capability field(Conventional)) indicating the contents of Symmetric ROHC and field (Capability field (New)) indicating the contents of the Asymmetric ROHC are included in the capability information (UE-EUTRA-Capability) of the UE 200.

As shown in FIG. 6A, the eNB 100A transmits the support notification of the Asymmetric ROHC to the UE 200. In this case, the UE 200 does not include Capability field(Conventional) but notifies the eNB 100A of the capability information containing only Capability field(New). That is, the UE 200 does not use the Capability field(Conventional).

On the other hand, as shown in FIG. 6B, because the eNB 100B does not support the Asymmetric ROHC, the eNB 100B does not transmit the support notification of the Asymmetric ROHC. In this case, the UE 200 does not use any of the Capability field(Conventional) and the Capability field(New), and does not transmit them to the eNB 100B.

Because the eNB 100B does not receive the capability information including even the Capability field(Conventional), the eNB 100B merely determines that the UE 200 does not support the ROHC, and does not perform the header compression by applying the ROHC. That is, the eNB 100B handles the UE 200 as the UE that does not support the ROHC.

Figure 7:
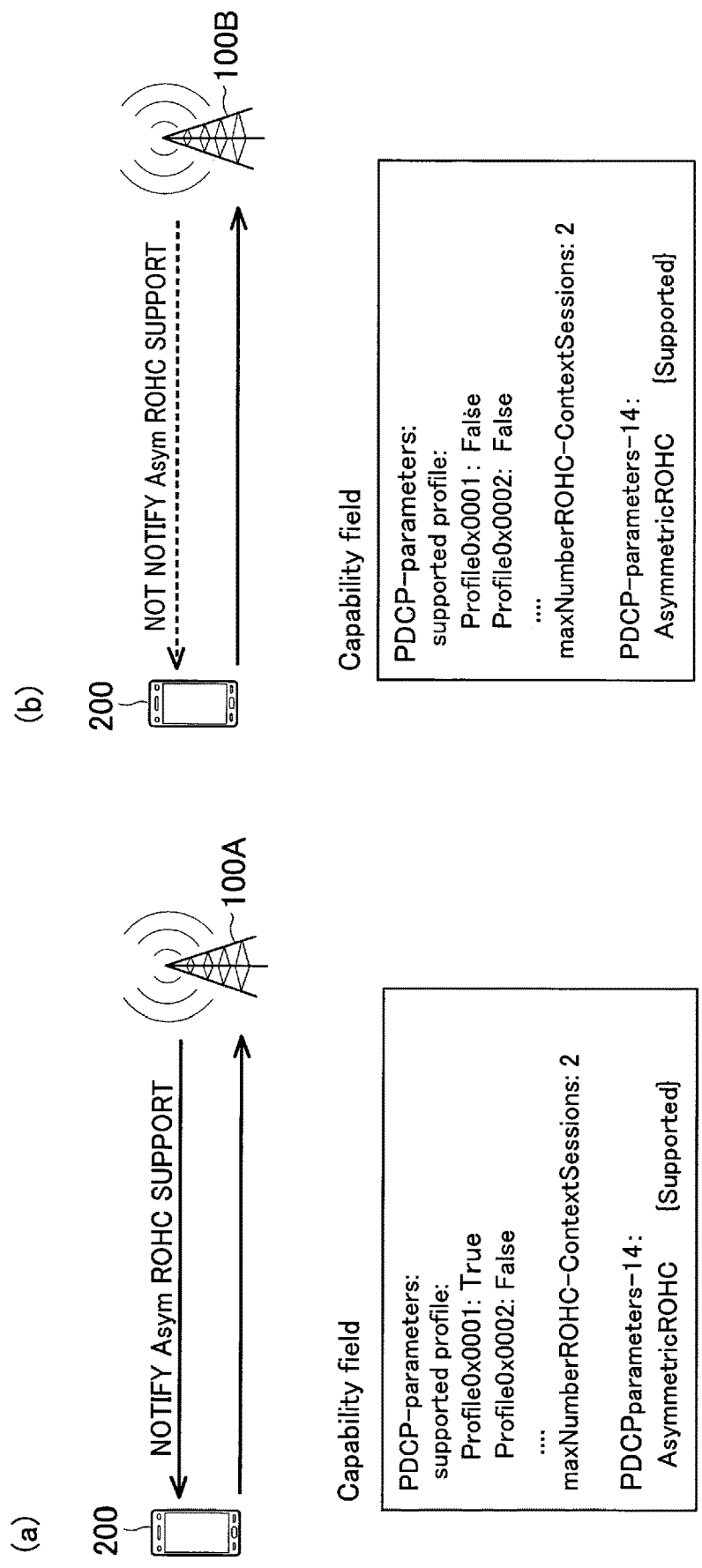
FIGS. 7A and 7B are views showing configuration examples of capability information in which information indicating that the Asymmetric ROHC is supported is included in a field indicating the contents of the existing Symmetric ROHC.

FIGS. 7A and 7B are views showing configurations example of the capability information in which information indicating that the Asymmetric ROHC is supported is included in the field indicating the contents of the existing Symmetric ROHC.

In the configuration examples of the capability information shown in FIGS. 7A and 7B, the field (Capability field) indicating the contents of the existing Symmetric ROHC is used, and the contents of the Asymmetric ROHC are included only when the eNB supports the Asymmetric ROHC.

As shown in FIG. 7A, the eNB 100A transmits the support notification of the Asymmetric ROHC to the UE 200. In this case, the UE 200 uses the existing supportedROHC-Profiles and notifies of the profile of the Asymmetric ROHC. In FIG. 7A, Profile0x0001 is set to True. Moreover, the number of the sessions maxNumberROHC-ContextSessions usable for the header compression is set to 2. This value means only the number of the sessions applied to the UL. That is, this value corresponds to a situation in which the Asymmetric ROHC is applied.

Moreover, as shown in FIG. 7A, the UE 200 uses the existing supportedROHC-Profiles and notifies that the Asymmetric ROHC is supported. In FIG. 7A, as PDCP-parameters-14 (PDCP parameter for Release-14), it is shown that the Asymmetric ROHC is supported.

The eNB 100A that received the capability information including such Capability field recognizes that the UE 200 supports the Asymmetric ROHC, moreover, reads the value of the maxNumberROHC-ContextSessions, not as a value including both the UL and the DL direction as in the existing Symmetric ROHC, but as a value to be applied only to one direction (UL).

On the other hand, as shown in FIG. 7B, because the eNB 100B does not support the Asymmetric ROHC, the eNB 100B does not transmit the support notification of the Asymmetric ROHC. In this case, the UE 200 transmits the capability information in itself including the Capability field; however, sets the supportedROHC-Profiles that indicates that the ROHC is not supported. Specifically, in FIG. 7B, any of Profile0x0001 and Profile0x0002 are set to False.

The eNB 100B that received the capability information including such Capability field merely determines that the UE 200 does not support the Asymmetric ROHC, and does not perform the header compression by applying the ROHC.

(3.2) Operation Example 2

Figure 8:
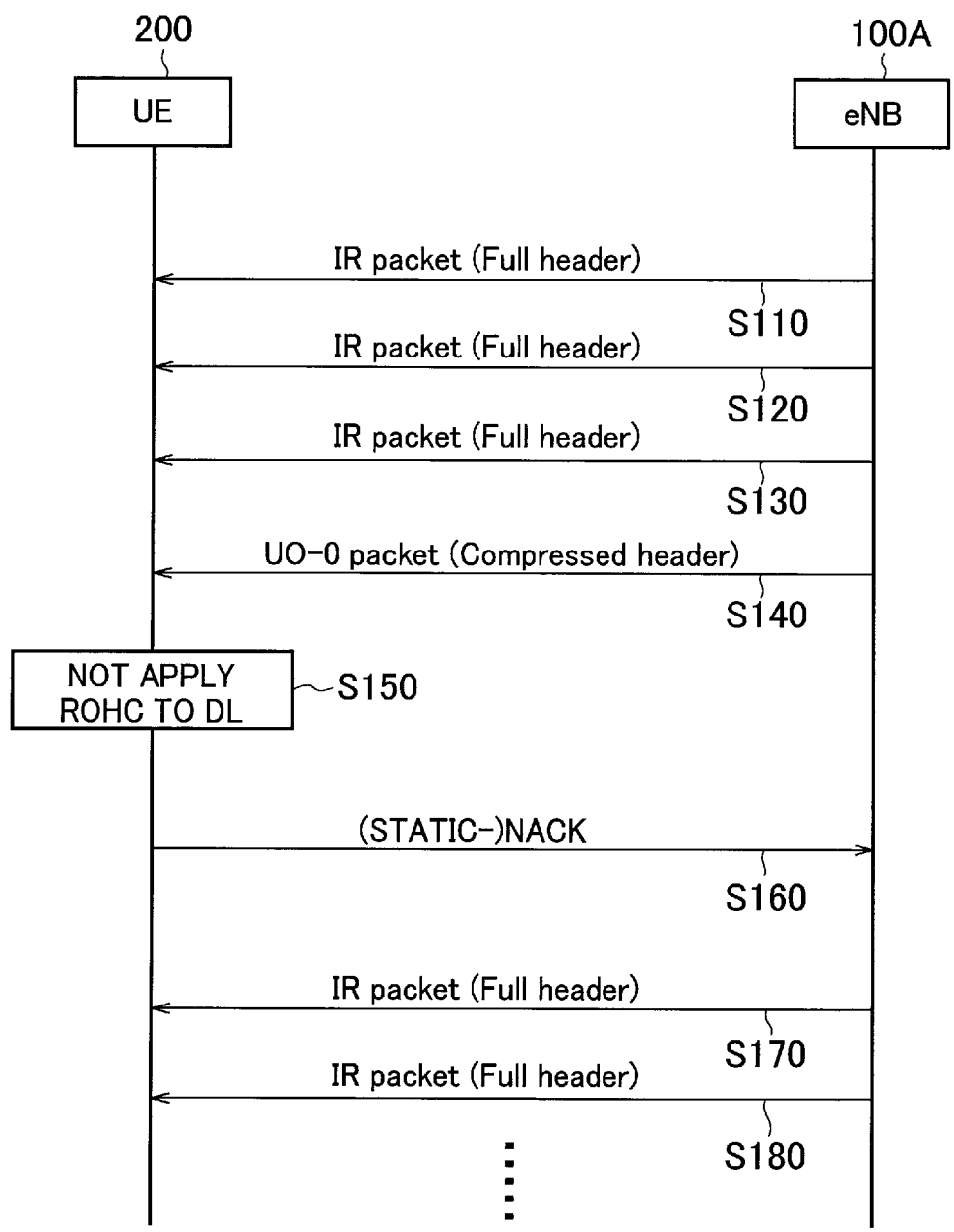
FIG. 8 is a view showing an application operation sequence (Operation Example 2) of the Asymmetric ROHC by the eNB 100A and the UE 200.

FIG. 8 is a view showing an application operation sequence (Operation Example 2) of the Asymmetric ROHC by the eNB 100A and the UE 200.

As shown in FIG. 8, the eNB 100A starts communication with the UE 200, and transmits a predetermined number of IR packets including a full header, that is, the packets in which the header compression is not performed by the application of the ROHC (Steps S110 to S130).

Note that, the IR packet is a type (Initiation and Refresh state) of a packet prescribed in RFC3095, and the IR packet is used in the Decompressor side for establishing ROHC Context.

More specifically, in the IR packet, IP packet is sent with a full header without compressing, and at the Decompressor side, it is possible to establish the context based on the contents and a change pattern of the header. Note that, other information (e.g., Context ID) necessary for the ROHC is further notified by using ROHC header.

Then, after transmitting the predetermined number of the IR packets including the full header, the eNB 100A transmits UO-0 packet (compressed packet) that has been subjected to the header compression by application of the ROHC (Step S140). The UO-0 packet is also prescribed in the RFC3095.

Upon receiving the UO-0 packet, the UE 200 determines to apply the Asymmetric ROHC in a receiving direction of the UE 200, that is, not to apply the ROHC in the DL direction (Step S150). That is, the UE 200 applies the ROHC only in the UL direction.

In order not to apply the ROHC in the DL direction, the UE 200 returns to the eNB 100A the NACK (STATIC-NACK) indicating that the UO-0 packet could not be received (Step S160).

The eNB 100A that received this NACK determines that the UE 200 cannot process the compressed packet. Accordingly, the eNB 100A transmits, not the compressed packet, but the IR packet (non-compressed packet) including the full header (Steps S170 and S180).

Note that, it is allowable that the eNB 100A transmits the non-compressed packet by the IR packet, and allocates the packet (IP flow data) only to Uncompressed session.

Figure 9:
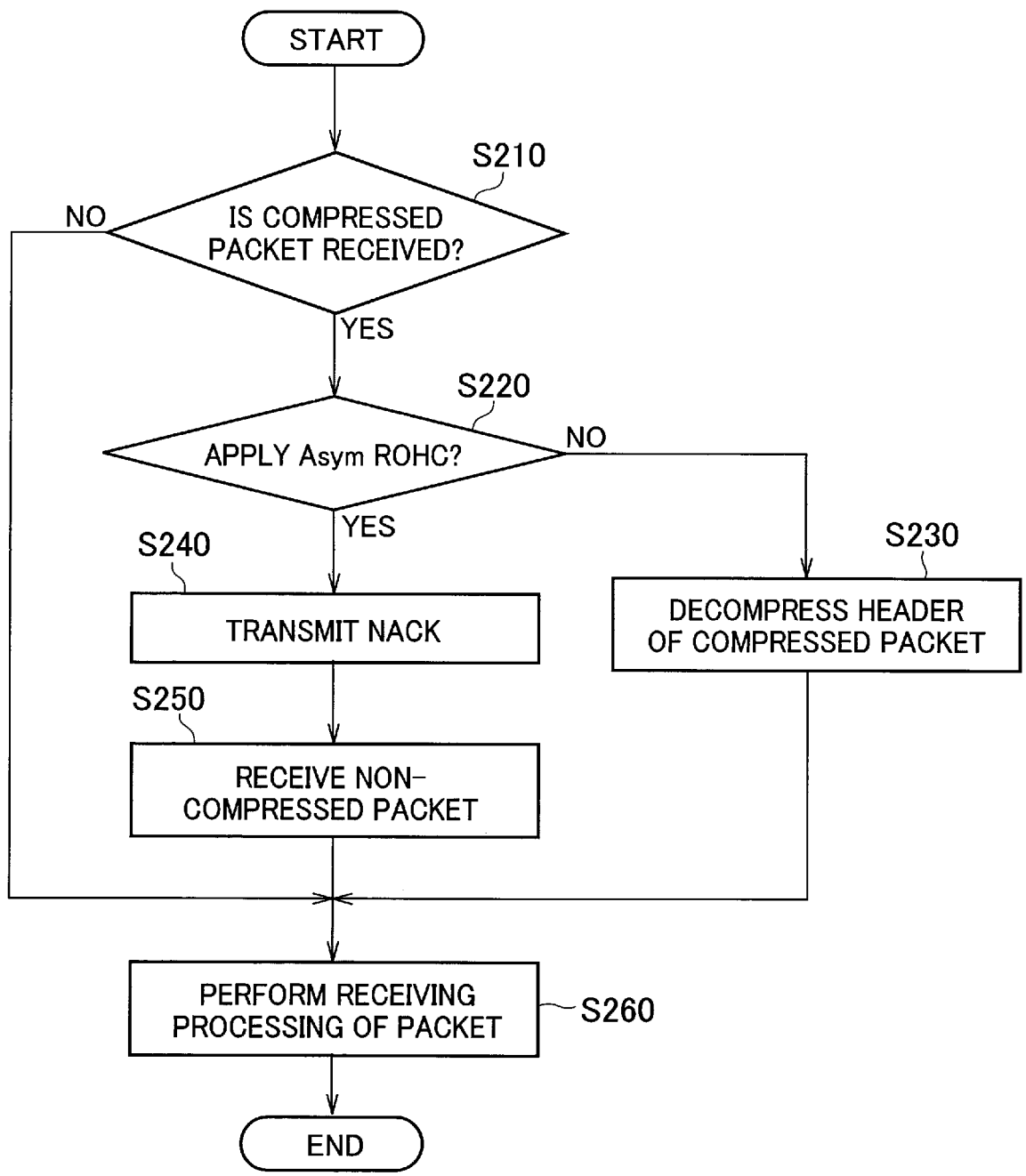
FIG. 9 is an operation flowchart (Operation Example 2) of the UE 200.

FIG. 9 is an operation flowchart (Operation Example 2) of the UE 200. Specifically, FIG. 9 shows the operation flow in the UE 200 after the processing at Step S140 shown in FIG. 8 is over.

As shown in FIG. 9, the UE 200 determines whether the compressed packet (UO-0 packet) subjected to the header compression by application of the ROHC is received (Step S210).

Upon receiving the compressed packet, the UE 200 determines whether to apply the Asymmetric ROHC that does not apply the ROHC in the DL direction (Step S220). Note that, the processing at Step S220 can be performed before performing the processing at Step S210.

When not applying the Asymmetric ROHC, the UE 200 performs decompression (Decompress) of the header of the compressed packet (Step S230).

When applying the Asymmetric ROHC, the UE 200 returns to the eNB 100A the NACK (STATIC-NACK) indicating that the UO-0 packet could not be received (Step S240).

After the UE 200 returns the NACK to the eNB 100A, as shown in FIG. 8, the eNB 100A transmits, not the compressed packet, but the IR packet (non-compressed packet) including the full header. The UE 200 receives the non-compressed packet (Step S250).

Then, the UE 200 performs a receiving processing of the packet (Step S260). Specifically, the UE 200 reconstitutes PDU/SDU based on the contents of the header, and outputs the PDU/SDU to the upper layer.

Note that, in the case of Operation Example 2 too, as mentioned earlier, the UE 200 can notify the eNB 100A of the capability information of the UE 200 relating to the Asymmetric ROHC.

In Operation Example 2, if the UE 200 notifies the eNB 100A of the capability information of the UE 200, the eNB 100A avoids unnecessarily transmitting the compressed packet to the UE 200. On the other hand, the eNB 100B, which does not support the Asymmetric ROHC, by returning of the NACK, simply recognizes that the memory of the UE 200 is insufficient.

(3.3) Operation Example 3

In Operation Example 3, as mentioned earlier, the UE 200 transmit the capability information of both the Symmetric ROHC and the Asymmetric ROHC. A basic operation flow, and a notification example and a variation example of application of the Asymmetric ROHC in the present operation example is explained below.

(3.3.1) Basic Operation Flow

Figure 10:
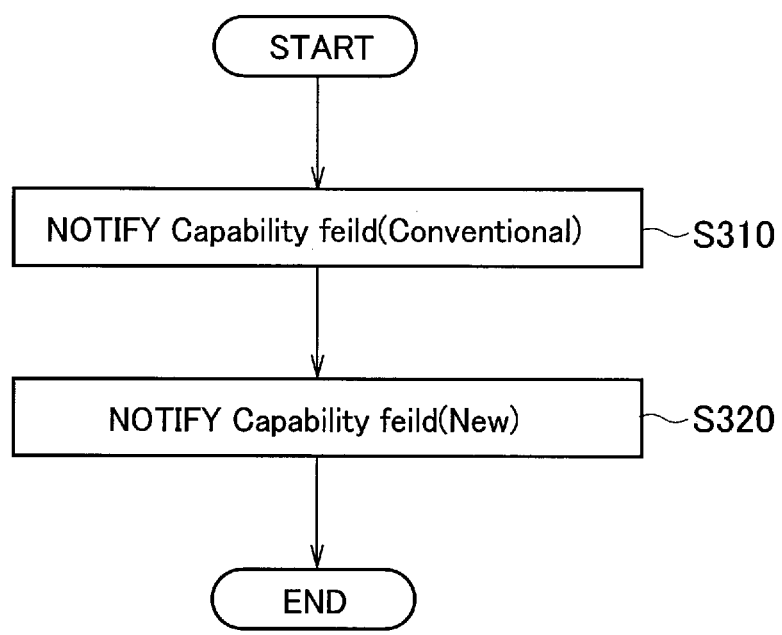
FIG. 10 is another operation flowchart (Operation Example 3) of the UE 200.

FIG. 10 is an operation flowchart (Operation Example 3) of the UE 200. As shown in FIG. 10, the UE 200 notifies the eNB 100A (or eNB 100B) of the Capability field(Conventional) (Step S310). Although the Capability field(Conventional) is similar to that explained in Operation Example 1 (see FIG. 6), the same is explained later in more detail.

The UE 200 notifies the eNB 100A (or eNB 100B) of the Capability field(New) (Step S320). Although the Capability field (New) is similar to that explained in Operation Example 1 (see FIG. 6), the same is explained later in more detail.

Note that, Steps S310 and S320 can be interchanged. In this manner, irrespective of whether the support notification indicating that the Asymmetric ROHC is supported is received, the UE 200 notifies the eNB 100A of the capability information including Capability field(Conventional), that is, the field indicating the contents of the Symmetric ROHC and the Capability field(New), that is, the field indicating the contents of the Asymmetric ROHC.

Figure 11:
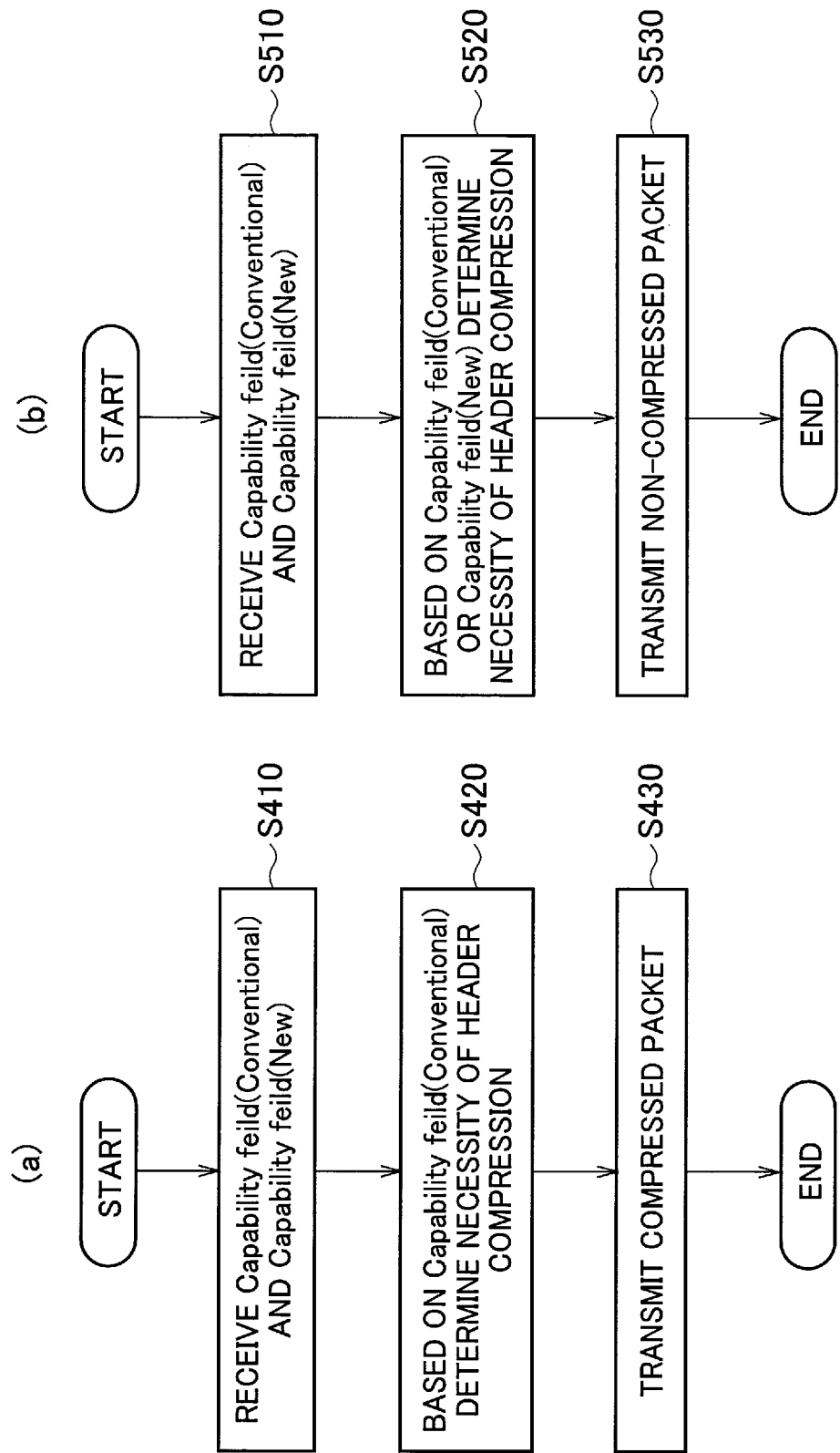
FIGS. 11A and 11B are views showing application operation sequences of the Asymmetric ROHC in the eNB 100A and the UE 200.

FIGS. 11A and 11B are views showing application operation sequences of the Asymmetric ROHC in the eNB 100A and the UE 200. Specifically, FIG. 11A shows an application operation flow of the Asymmetric ROHC in the eNB 100B. FIG. 11B shows an application operation flow of the Asymmetric ROHC in the eNB 100A.

As shown in FIG. 11A, the eNB 100B receives the capability information including the Capability field(Conventional) and the Capability field(New) (Step S410).

The eNB 100B, which does not support the Asymmetric ROHC, determines, based on the Capability field(Conventional), necessity of the header compression by application of the ROHC (Step S420). In this example, it is assumed that it is determined that the header compression by application of the ROHC is necessary.

The eNB 100B transmits the compressed packet to the UE 200 based on the result of the determination (Step S430).

On the other hand, as shown in FIG. 11B, the eNB 100A also receives the capability information including the Capability field(Conventional) and the Capability field(New) (Step S510).

The eNB 100A, which supports the Asymmetric ROHC, determines, based on one of the Capability field(Conventional) and the Capability field(New), necessity of the header compression by application of the ROHC (Step S520). Herein, it is assumed, based on the Capability field (New), that it is determined that the header compression is not unnecessary, that is, the ROHC is not to be applied.

The eNB 100A transmits the non-compressed packet to the UE 200 based on the result of the determination (Step S530).

In this manner, the eNB 100B (Asymmetric ROHC not supported) applies the Symmetric ROHC by referring to the contents of the existing Capability field(Conventional). On the other hand, the eNB 100A (Asymmetric ROHC supported) applies one of the Symmetric ROHC and the Asymmetric ROHC.

Note that, the UE 200 (header compression processing unit 230) notifies the eNB 100A (the eNB 100B) of the ROHC Capability relating to each of the Symmetric ROHC and the Asymmetric ROHC based on the scale (the number of the memories depending on maxNumberROHC-Context-Sessions) of the mounted memories. For the time being, assuming that the number of the memories to be allocated to the Symmetric ROHC is insufficient, it is allowable to notify the ROHC Capability of only the Asymmetric ROHC. Alternatively, when the number of the memories and/or the processing capacity applicable to the ROHC is insufficient, the UE 200 can perform Operation Example 2, that is, appropriately return the NACK, to apply the Asymmetric ROHC (or Symmetric ROHC) depending on the state of the memories.

(3.3.2) Notification Example of Application of Asymmetric ROHC

Figure 12:
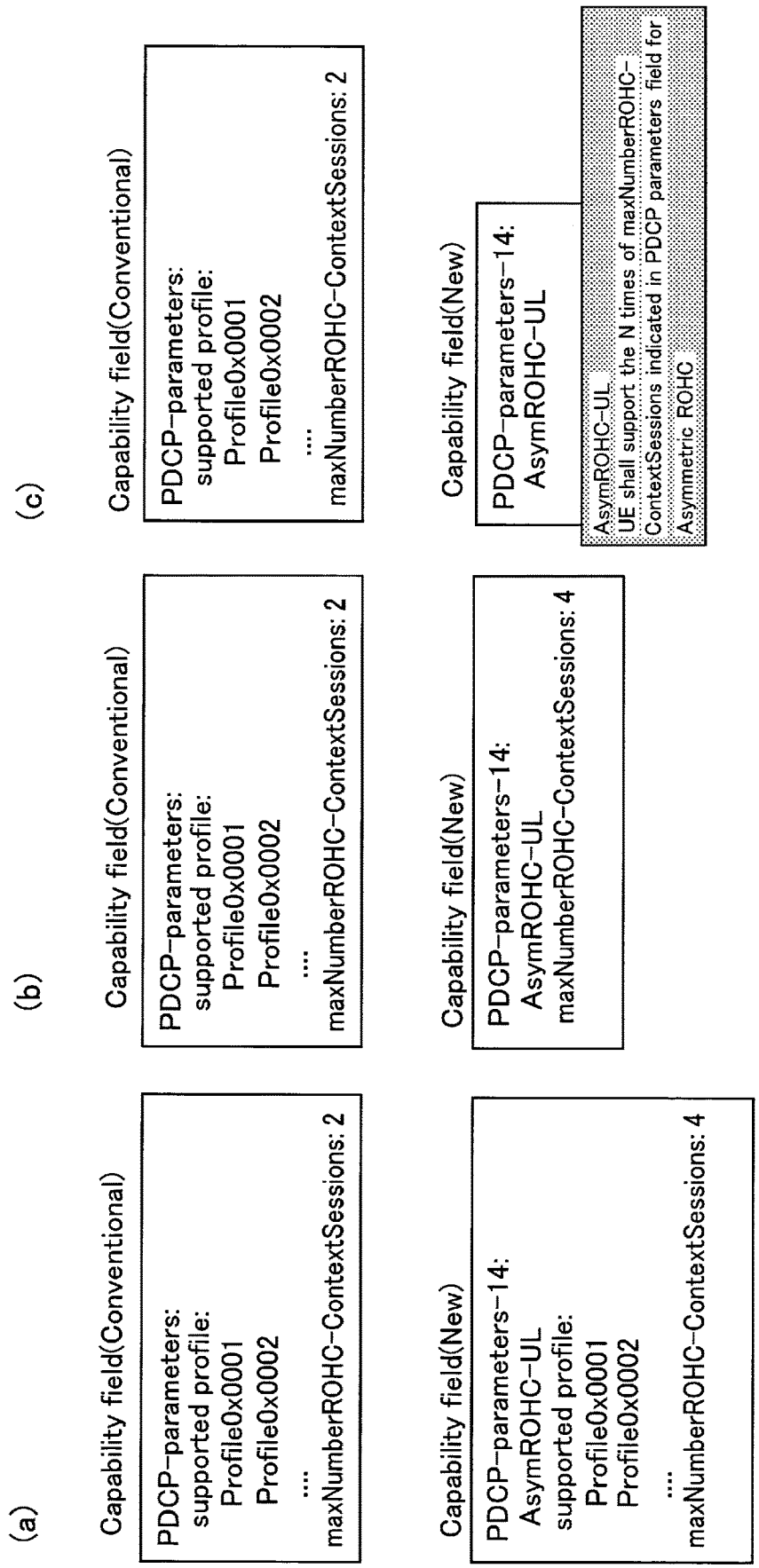
FIGS. 12A to 12C are views showing configuration examples of a field (Capability field) included in UE-EUTRA-Capability.

FIGS. 12A, 12B, and 12C are views showing configuration examples of a field (Capability field) included in the UE-EUTRA-Capability. As shown in FIGS. 12A, 12B, and 12C, in this operation example, the UE-EUTRA-Capability including both the Capability field(Conventional) and the Capability field(New) are notified.

FIG. 12A shows an example of notifying, by using the Capability field(New), all of the contents necessary for setting the Asymmetric ROHC. As shown in FIG. 12A, the ROHC is applied to the UL, and the profile (supportedROHC-Profiles) of the Asymmetric ROHC and the number of the sessions usable for the Asymmetric ROHC (maxNumberROHC-ContextSessions) are notified by using the Capability field(New).

FIGS. 12B and 12C shows an example of notifying, by using the Capability field(New), a part of the contents relating to the Asymmetric ROHC.

Specifically, as shown in FIG. 12B, the profile (supportedROHC-Profiles) of the Asymmetric ROHC is notified by using the Capability field(Conventional) and the number of the sessions usable for the Asymmetric ROHC (maxNumberROHC-ContextSessions) is notified by using the Capability field (New). That is, the supportedROHC-Profiles is commonly used with the field indicating the profile of the Symmetric ROHC.

In the example shown in FIG. 12C, the profile (supportedROHC-Profiles) of the Asymmetric ROHC and the number of the sessions usable for the Asymmetric ROHC (maxNumberROHC-ContextSessions) are notified by using the Capability field(Conventional). That is, the supportedROHC-Profiles and the maxNumberROHC-ContextSessions are commonly used with the corresponding field of the Symmetric ROHC.

In this case, the Capability field(New) is used to only notify that the ROHC is applied in the UL (AsymROHC-UL of FIG. 12C).

Moreover, in this case, as shown in the lower part of FIG. 12C (see the rectangle filled with slanted lines below the Capability field(New)), it is allowable to separately determine in the specification of the 3GPP regarding what multiple (for example, two) (specifically, a session (memory) number) of the existing region can be supported as the Asymmetric ROHC, and the like.

(3.3.3) Variation Example

A variation example of the present operation example is explained below. A possibility of application of the Asymmetric ROHC and the number of the sessions for the ROHC (the number of the memories) can be set for each of the bearers (DRB). However, like in the present operation example, when the ROHC Capability of the Symmetric ROHC and the ROHC Capability of the Asymmetric ROHC are notified separately, for example, particularly, when a plurality of the DRBs is set between the eNB 100A and the UE 200, the eNB 100A cannot determine how to set the Symmetric ROHC and Asymmetric ROHC for each of the DRBs.

As a result, it becomes difficult for the eNB 100A to achieve the advantage (transmission efficiency) of ROHC that by making use of the capability (the number of the mounted memories) of the UE 200 to the maximum extent.

FIGS. 13A to 13D are views showing setting examples of the ROHC when the Symmetric ROHC and the Asymmetric ROHC coexist.

Figure 13:
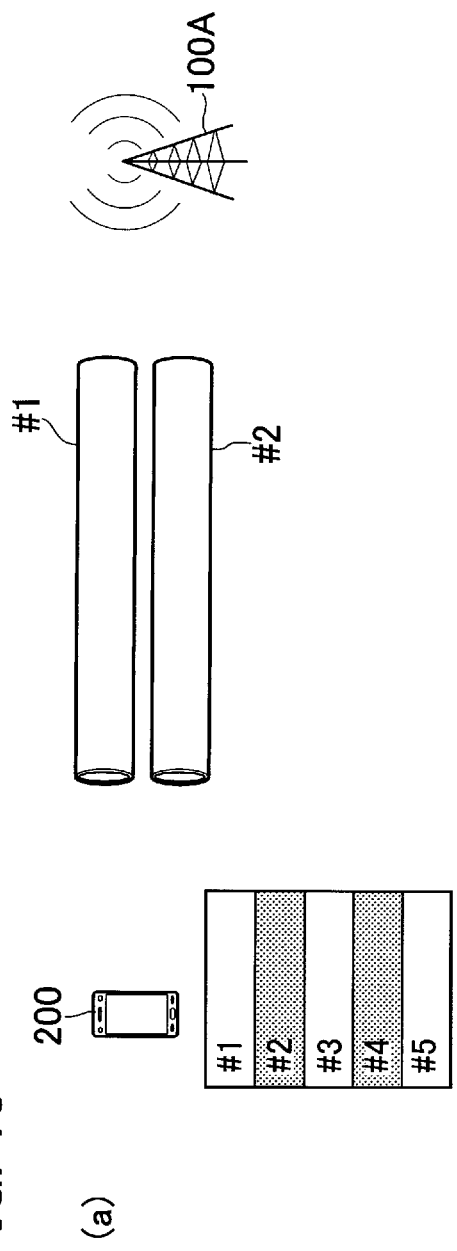
FIGS. 13A to 13D are views showing setting examples of the ROHC when the Symmetric ROHC and the Asymmetric ROHC coexist.

As shown in FIG. 13A, in this example, two DRBs (#1 and #2) are set between the eNB 100A and the UE 200. Moreover, it is assumed that the UE 200 is equipped with five memories, #1 to #5, for the ROHC.

In this example, as the setting examples of the Symmetric ROHC and the Asymmetric ROHC per DRB, for example, the pattern shown in FIGS. 13B to 13D can be listed. In FIG. 13B, the Symmetric ROHC for one session is set for each of the DRBs. As a result, four memories ((1 for UL+1 for DL)×2) of the UE 200 are consumed.

In FIG. 13C, the Asymmetric ROHC for three sessions are set for the DRB #1 and the Asymmetric ROHC for two sessions are set for the DRB #2. As a result, five memories (3 for UL+2 for UL) of the UE 200 are consumed.

In FIG. 13D, the Symmetric ROHC for one session is set for the DRB #1 and the Asymmetric ROHC for three sessions is set for the DRB #2. As a result, five memories ((1 for UL+1 for DL)+3 for UL) of the UE 200 are consumed.

In this manner, when a plurality of DRBs is set, and the Symmetric ROHC and the Asymmetric ROHC coexist, various allocation patterns are available. Accordingly, the eNB 100A previously recognizes available allocation patterns of the memories inside the UE 200, and can set the Symmetric ROHC and the Asymmetric ROHC based on these allocation patterns.

In this case, the UE 200 specifies available allocation patterns of the memories and previously notifies the eNB 100A of the specified allocation patterns. FIG. 14 is a view showing examples of allocation patterns specified by the UE 200 when the Symmetric ROHC and the Asymmetric ROHC coexist.

As shown in FIG. 14, available allocation patterns are specified according to the number of the memories mounted in the UE 200 (in the present example, five). Note that, the allocation patterns can be determined by considering the number of settable DRBs.

Moreover, the allocation patterns may include a priority of each of the patterns. The priority may be changed while the communication is being performed (specifically, RRC-CONNECTED state). Furthermore, if the priority is changed while the communication is being performed, the UE 200 can notify that the priority is changed by using some message of RRC/PDCP/RLC/MAC layer.

Based on the contents notified thereto, the eNB 100A can set one between the Symmetric ROHC and the Asymmetric ROHC such that the capability (the number of the memories) of the UE 200 does not exceed. Moreover, the eNB 100A may update the contents (priority) of the allocation patterns based on the contents notified thereto.

FIGS. 15A to 15C are views showing notification examples of allocation patterns when the Symmetric ROHC and the Asymmetric ROHC coexist.

As shown in FIG. 15A, when the Symmetric ROHC and the Asymmetric ROHC coexist, the allocation pattern can be notified by using a plurality of lists (each outer rectangle in FIG. 15A represents one list) constituted by the ROHC Capability of the Symmetric ROHC and the ROHC Capability of the Asymmetric ROHC.

Alternatively, as shown in FIG. 15B, it is allowable to notify allocation patterns including the maximal number of the memories allocable in the UE 200, that is, maxNumberROHC-ContextSessions, and the ROHC Capability of one of the Symmetric ROHC and the Asymmetric ROHC. In this case, the allocation (Symmetric ROHC in FIG. 15B) of the notified ROHC can be shown implicitly by the maximal number of the memories (15) and the number of the allocations of the Asymmetric ROHC.

Furthermore, as shown in FIG. 15C, because the allocation patterns are prescribed in the specification of the 3GPP, it is allowable to notify only an index for recognizing the allocation pattern. Alternatively, each index can be set to True (available) or False (unavailable)

(4) Effects and Advantages

With the present embodiment, the following effects and advantages can be obtained. Specifically, in Operation Example 1, when the support notification relating to the Asymmetric ROHC is received from the eNB, the UE 200 notifies the eNB 100A of the information to be uses for setting the Asymmetric ROHC by including the profile of the Asymmetric ROHC in the capability information (UE-EUTRA-Capability) of the UE 200. On the other hand, the eNB 100B, which does not support the Asymmetric ROHC, is not notified of the profile of Asymmetric ROHC. Therefore, the eNB 100B handles the UE 200 as the UE that does not support the ROHC, and the eNB 100B does not perform the header compression by application of the ROHC in the DL direction.

Moreover, in Operation Example 1, the UE 200 can notify the eNB 100A (the eNB 100B) of the capability information including the field indicating the contents of the Symmetric ROHC and the field indicating the contents of the Asymmetric ROHC that is separate from the field indicating the contents of the Symmetric ROHC. Furthermore, in Operation Example 1, the UE 200 can notify the eNB 100A (the eNB 100B) of the capability information in which information indicating that the Asymmetric ROHC is supported is included in the field indicating the contents of the Symmetric ROHC.

Therefore, the eNB 100A (Asymmetric ROHC supported) can be notified of the information necessary for setting the Asymmetric ROHC without adversely affecting the ROHC setting by the eNB 100B (Asymmetric ROHC non-supported). Accordingly, the Asymmetric ROHC can be introduced while securing the backward compatibility with the eNB 100B (Asymmetric ROHC non-supported).

In Operation Example 2, upon receiving the compressed packet compressed by the application of the ROHC following the non-compressed packet, the UE 200 transmits the NACK (negative response) to the eNB 100A indicating that the compressed packet could not be received. Therefore, transmission of the compressed packet by the eNB 100A is canceled, and instead, the non-compressed packet is transmitted. Accordingly, the Asymmetric ROHC, which does not apply the ROHC in the receiving direction (that is, DL direction) of the UE 200, can be set.

On the other hand, the eNB 100B, which does not support the Asymmetric ROHC, by returning of the NACK, simply recognizes that the memory of the UE 200 is insufficient. As a result, the ROHC is not applied to the packets transmitted and received to and from the eNB 100B.

Accordingly, the Asymmetric ROHC can be introduced while securing the backward compatibility with the eNB 100B (Asymmetric ROHC non-supported).

Moreover, in Operation Example 2, like in Operation Example 1, the UE 200 can notify the eNB 100A of the capability information of the UE 200. In this case, the eNB 100A can avoid unnecessarily transmitting the compressed packet to the UE 200.

In Operation Example 3, the UE 200 can notify the eNB 100A of the capability information including the field indicating the contents of the Symmetric ROHC and the field indicating the contents of the Asymmetric ROHC that is separate from the field indicating the contents of the Symmetric ROHC. Therefore, the UE 200 can notify of the ROHC Capability that can be recognized by both the eNB 100A (Asymmetric ROHC supported) and the eNB 100Bs (Asymmetric ROHC non-supported). Accordingly, the Asymmetric ROHC can be introduced while securing the backward compatibility with the eNB 100B (Asymmetric ROHC non-supported).

Moreover, at least the field indicating the profile of the Asymmetric ROHC can be commonly used with the field indicating the profile of the Symmetric ROHC. Therefore, the Asymmetric ROHC can be introduced while limiting the amount of information required for setting the Asymmetric ROHC.

That is, in the above embodiment, the Asymmetric ROHC can be suitably set even when the eNB 100A that supports the Asymmetric ROHC and the eNB 100B that supports only the existing Symmetric ROHC coexist.

Furthermore, by notifying the eNB 100A of the information that is required for setting the Asymmetric ROHC, the header compression by application of the Asymmetric ROHC that makes use of the memories for the ROHC that are mounted in the UE 200 to the maximum extent can be realized.

(5) Other Embodiments

The present invention has been explained in detail by using the above mentioned embodiments; however, it is self-evident to a person skilled in the art that the present invention is not limited to the embodiments explained herein and that the embodiments can be modified or improved in various ways.

For example, the above ROHC Capability relating to the Asymmetric ROHC can be used as Capability of TCP ACK less function. The TCP ACK less function is a function that is used to reduce a radio band necessary for transmitting a positive response (TCP ACK) in TCP layer.

Specifically, the receiver side that received the packet destroys the packet without transmitting the TCP ACK. Upon receiving the ACK (e.g., RLC-ACK) in a layer 2 with respect to PDCP SDU (IP packet), the transmitting side of the packet generates the TCP ACK by itself and the transmits the TCP ACK to the upper layer.

That is, to achieve a peak throughput in the DL by using a traffic flow by the TCP, it is necessary to also secure the UL band for transmitting the TCP ACK; however, in TDD system, limitation due to asymmetry (DL band is broadband that UL band) of the radio resource of DL/UL can occur.

The TCP ACK less function has been proposed to solve this problem. By combinedly applying the Capability of the Asymmetric ROHC and the TCP ACK less function, it becomes possible to distribute the radio resource to the DL/UL, and further, give priority to the DL. Moreover, the combination of the Asymmetric ROHC and TCP ACK less functions is also very effective from the viewpoint of further effective use of the DL/UL band.

Moreover, in case of the TCP ACK less function, it is necessary to grasp the contents of PDCP SDU. However, since a mechanism to grasp the contents of the PDCP SDU already exists in the ROHC, some contents thereof can be used in common with the TCP-ACK less function, and this gives an advantage from the viewpoint of implementation of the UE 200 and the eNB 100A.

Moreover, in the above embodiment, the ROHC has been used as the protocol for the header compression; however, the protocol for the header compression is not necessarily limited to the ROHC. That is, any protocol having the same header compression function as the ROHC can be used as the protocol for the header compression.

In the embodiment, an example in which the ROHC is applied only in the UL direction without applying in the DL direction is explained; however, depending on characteristics and the like of the data transmitted and received by the UE 200, the ROHC can be applied only in the DL direction without applying in the UL direction.

Moreover, in the above embodiment, the UE 200 notified the eNB 100A (the eNB 100B) of the capability of the Asymmetric ROHC; however, the eNB 100A (the eNB 100B) can have the similar function. That is, the eNB 100A (the eNB 100B) can notify the UE 200 of the capability of the Asymmetric ROHC, and the UE 200 can set the Asymmetric ROHC based on capability notified thereto.

Moreover, the block diagrams used for explaining the embodiments (FIGS. 2 and 3) show functional block diagrams. Those functional blocks (structural components) can be realized by a desired combination of hardware and/or software. Means for realizing each functional block is not particularly limited. That is, each functional block may be realized by one device combined physically and/or logically. Alternatively, two or more devices separated physically and/or logically may be directly and/or indirectly connected (for example, wired and/or wireless) to each other, and each functional block may be realized by these plural devices.

Figure 16:
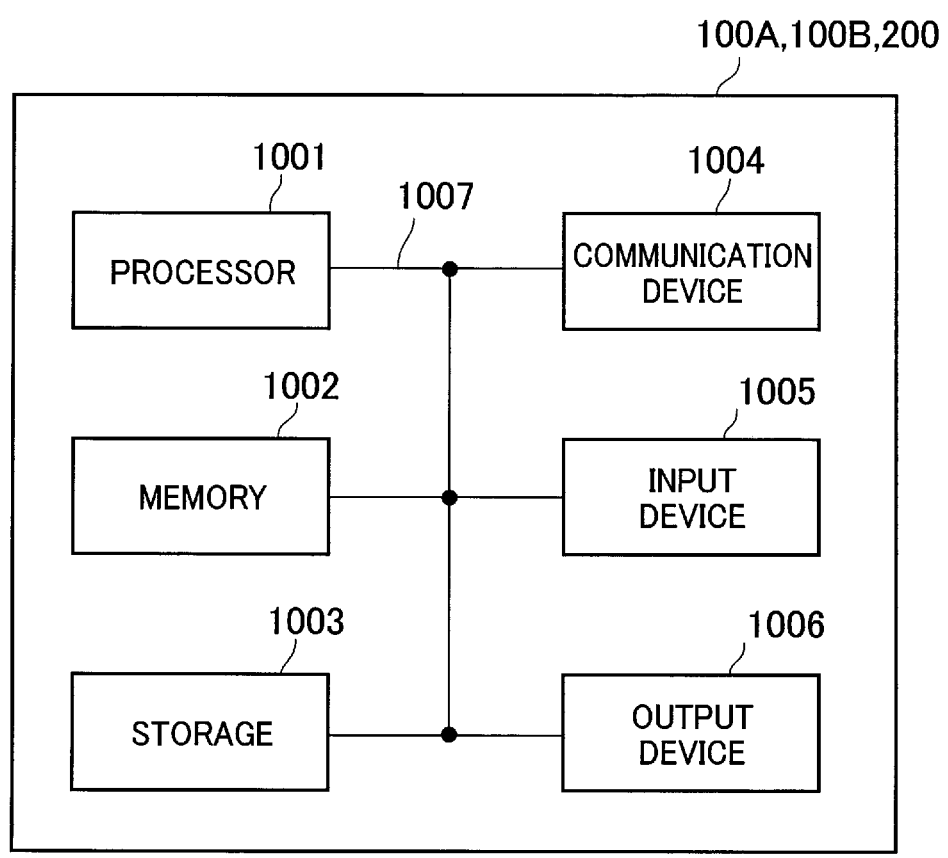
FIG. 16 is a view showing an example of a hardware configuration of the eNBs 100A and 100B and the UE 200.

Furthermore, the eNBs 100A and 100B, and the UE 200 (devices) explained above can function as a computer that performs the transmission power control processing of the present invention. FIG. 16 is a diagram showing an example of a hardware configuration of the devices. As shown in FIG. 16, each of the devices can be configured as a computer device including a processor 1001, a memory 1002, a storage 1003, a communication device 1004, an input device 1005, an output device 1006, a bus 1007, and the like.

The functional blocks of the devices (see FIGS. 2 and 3) can be realized by any of hardware elements of the computer device or a desired combination of the hardware elements.

The processor 1001, for example, operates an operating system to control the entire computer. The processor 1001 can be configured with a central processing unit (CPU) including an interface with a peripheral device, a control device, a computing device, a register, and the like.

The memory 1002 is a computer readable recording medium and is configured, for example, with at least one of ROM (Read Only Memory), EPROM (Erasable Programmable ROM), EEPROM (Electrically Erasable Programmable ROM), RAM (Random Access Memory), and the like. The memory 1002 can be called register, cache, main memory (main memory), and the like. The memory 1002 can store therein a computer program (computer program codes), software modules, and the like that can execute the method according to the above embodiments.

The storage 1003 is a computer readable recording medium. Examples of the storage 1003 include an optical disk such as CD-ROM (Compact Disc ROM), a hard disk drive, a flexible disk, a magneto-optical disk (for example, a compact disk, a digital versatile disk, a Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

In addition, the respective devices, such as the processor 1001 and the memory 1002, are connected to each other with the bus 1007 for communicating information there among. The bus 1007 can be constituted by a single bus or can be constituted by separate buses between the devices.

In addition, the manner of notification of information is not limited to the one explained in the embodiments, and the notification may be performed in other manner. For example, the notification of information can be performed by physical layer signaling (for example, DCI (Downlink Control Information), UCI (Uplink Control Information)), upper layer signaling (for example, RRC signaling, MAC (Medium Access Control) signaling, notification information (MIB (Master Information Block), SIB (System Information Block)), other signals, or a combination thereof. In addition, the RRC signaling can be called RRC message, and the RRC signaling can be, for example, RRC Connection Setup message, RRC Connection Reconfiguration message, and the like.

Furthermore, the input/output information can be stored in a specific location (for example, a memory) or can be managed in a management table. The information to be input/output can be overwritten, updated, or added. The information can be deleted after outputting. The inputted information can be transmitted to another device.

The order of the sequences, flowcharts, and the like in the embodiments can be rearranged unless there is a contradiction.

Moreover, in the embodiments explained above, the specific operations performed by the eNB 100A (eNB 100B, same holds true in the below explanation) can be performed by another network node (device). Moreover, functions of the eNB 100A can be provided by combining a plurality of other network nodes.

Moreover, the terms used in this specification and/or the terms necessary for understanding the present specification can be replaced with terms having the same or similar meanings. For example, a channel and/or a symbol can be replaced with a signal (signal) if that is stated. Also, the signal can be replaced with a message. Moreover, the terms "system" and "network" can be used interchangeably.

Furthermore, the used parameter and the like can be represented by an absolute value, can be expressed as a relative value from a predetermined value, or can be represented by corresponding other information. For example, the radio resource can be indicated by an index.

The eNB 100A (base station) can accommodate one or more (for example, three) cells (also called sectors). In a configuration in which the base station accommodates a plurality of cells, the entire coverage area of the base station can be divided into a plurality of smaller areas. In each such a smaller area, communication service can be provided by abase station subsystem (for example, a small base station for indoor use RRH: Remote Radio Head).

The term "cell" or "sector" refers to a part or all of the coverage area of a base station and/or a base station subsystem that performs communication service in this coverage. In addition, the terms "base station" "eNB", "cell", and "sector" can be used interchangeably in the present specification. The base station can also be referred to as a fixed station, NodeB, eNodeB (eNB), an access point, a femtocell, a small cell, and the like.

The UE 200 is called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

As used herein, the phrase "based on" does not mean "based only on" unless explicitly stated otherwise. In other words, the phrase "based on" means both "based only on" and "based at least on".

Furthermore, the terms "including", "comprising", and variants thereof are intended to be inclusive in a manner similar to "having". Furthermore, the term "or" used in the specification or claims is intended not to be an exclusive disjunction.

Any reference to an element using a designation such as "first", "second", and the like used in the present specification generally does not limit the amount or order of those elements. Such designations can be used in the present specification as a convenient way to distinguish between two or more elements. Thus, the reference to the first and second elements does not imply that only two elements can be adopted, or that the first element must precede the second element in some or the other manner.

Throughout the present specification, for example, during translation, if articles such as a, an, and the in English are added, these articles shall include plurality, unless it is clearly indicated that it is not so according to the context.

As described above, the details of the present invention have been disclosed by using the embodiments of the present invention. However, the description and drawings which constitute part of this disclosure should not be interpreted so as to limit the present invention. From this disclosure, various alternative embodiments, examples, and operation techniques will be apparent to a person skilled in the art.

INDUSTRIAL APPLICABILITY

As mentioned earlier, with the present invention, it is possible to suitably set the asymmetric header compression even when a radio base station that supports the asymmetric header compression, in which the header compression by ROHC is applied to one of the uplink and the downlink, and a radio base station that supports only the existing symmetric header compression coexist.

EXPLANATION OF REFERENCE NUMERALS

10 radio communication system
20 radio access network
31, 32 DRB
100A, 100B eNB
110 radio communication unit
120 data transmitting-receiving unit
130 header compression processing unit
140 UE capability acquiring unit
200 UE
210 radio communication unit
220 data transmitting-receiving unit
230 header compression processing unit
240 capability notifying unit
250 ACK/NACK processing unit
1001 processor
1002 memory
1003 storage
1004 communication device
1005 input device
1006 output device
1007 bus

The invention claimed is:
1. A radio communication device comprising:
  a receiver that receives from an opposing radio communication device a capability information of the opposing radio communication device including a profile of asymmetric header compression and a number of sessions usable for header compression, the profile of the asymmetric header compression being a RObust Header Compression (ROHC) supported in uplink-only ROHC operation by the opposing radio communication device; and
  a processor that recognizes support of the asymmetric header compression by the opposing radio communication device based on the received capability information,
  wherein the radio communication device performs the asymmetric header compression in which the header compression being the ROHC is applied in a packet data convergence protocol layer to either an uplink or a downlink, and wherein a number of sessions for the header compression applicable to either the uplink or the downlink is based on a number of sessions usable for the header compression.

2. A radio communication device comprising:
a processor coupled to a transmitter that:
notifies an opposing radio communication device of capability information of the radio communication device including a profile of asymmetric header compression, the profile of the asymmetric header compression being a Robust Header Compression (ROHC) supported in uplink-only ROHC operation by the opposing radio communication device, and
notifies of the capability information including a field indicating contents of symmetric header compression in which header compression is applied in both an uplink and a downlink and a field indicating contents of the asymmetric header compression that is different from the field indicating contents of the symmetric header compression,
wherein the radio communication device performs the asymmetric header compression in which the header compression being the ROHC is applied in a packet data convergence protocol layer to either the uplink or the downlink.

3. A radio communication method implemented on a radio communication device comprising:
receiving from an opposing radio communication device a capability information of the opposing radio communication device including a profile of asymmetric header compression and a number of sessions usable for header compression, the profile of the asymmetric header compression being a RObust Header Compression (ROHC) supported in uplink-only ROHC operation by the opposing radio communication device; and
recognizing support of the asymmetric header compression by the opposing radio communication device based on the received capability information,
wherein the radio communication device performs the asymmetric header compression in which the header compression being the ROHC is applied in a packet data convergence protocol layer to either an uplink or a downlink, and
wherein a number of sessions for the header compression applicable to either the uplink or the downlink is based on the number of sessions usable for the header compression.

4. A radio communication method implemented on a radio communication device comprising:
including in capability information of the radio communication device including a profile of asymmetric header compression and a field indicating contents of symmetric header compression in which header compression is applied in both an uplink and a downlink and a field indicating contents of the asymmetric header compression that is different from the field indicating contents of the symmetric header compression, the profile of the asymmetric header compression being a Robust Header Compression (ROHC) supported in uplink-only ROHC operation by an opposing radio communication device; and
notifying the opposing radio communication device of the capability information,
wherein the radio communication device performs the asymmetric header compression in which the header compression being the ROHC is applied in a packet data convergence protocol layer to either the uplink or the downlink.

* * * * *